3,084,028
PROCESS FOR RECOVERING BROMINE
Louis Foulletier, Lyon, and Michel Markiewicz, Pierre-Benite, Rhone, France, assignors to Societe d'Electro-Chimie d'Electro-Metallurgie et des Acieries Electriques d'Ugine, Paris, France, a corporation of France
No Drawing. Filed Feb. 19, 1962, Ser. No. 174,303
Claims priority, application France Feb. 21, 1961
4 Claims. (Cl. 23—216)

The present invention relates to a process for recovering bromine contained in the form of hydrobromic acid (hydrogen bromide) in a gaseous mixture resulting from the bromination of organic compounds.

In the course of bromination by substitution of a hydrogenated organic compound, half of the bromine is lost in the form of HBr, $$RH + Br_2 \rightarrow RBr + HBr$$

The usual process of recovering bromine consists in washing the gaseous reaction products with water or with an alkaline solution in order to obtain a hydrobromic acid solution or a solution of alkaline bromides, then to set free the bromine by the addition of chlorine. The major difficulty of this process results from the necessity of drying the bromine recovered in this manner, because in bromination operations, particularly in thermal bromination, water is generally harmful; it induces the decomposition of the organic products and increases corrosion risks.

The present invention permits in a particularly simple manner the recovery of bromine in anhydrous form.

It concerns a process for the recovery of bromine contained in the form of hydrobromic acid in a gaseous mixture resulting from the bromination of organic compounds, which comprises introducing chlorine gas at a temperature higher than 0° C. but not over about 50° C. into said mixture having a temperature higher than 0° C. but not over about 50° C., thereby reacting chlorine and hydrobromic acid gas and forming bromine gas and hydrochloric acid gas (hydrogen chloride gas), cooling the resulting gaseous mixture to a temperature of about 0° C. to —15° C. to condense bromine, and recovering the liquid bromine.

The chlorine gas and hydrobromic acid gas react, setting free the bromine and forming hydrochloric acid gas. Although it was known that chlorine gas and hydrobromic acid gas would react rapidly at temperatures of about 300–400° C., it was not obvious that they would react rapidly at low temperature, between 0 and 50° C. or even at temperatures lower than 0° C. Moreover, one could fear that along with this reaction, chlorination reactions of organic derivatives could take place, as well as substitution reactions between the free chlorine and the organic brominated derivatives present. However, applicants have found that such reactions, if they exist, are practically negligible.

Applicants have ascertained that the reaction speed of chlorine gas upon hydrobromic acid gas at low temperature, about 50° C. down to temperatures as low as about —15° C., in the presence of organic brominated derivatives, was very high; the necessary time of contact being less than 1.5 seconds. This speed is such that one can carry out the reaction of gaseous chlorine upon gaseous hydrobromic acid in a condenser which thereafter serves to condense the formed bromine gas to liquid bromine which separates from the remaining uncondensed gases.

The quantity of chlorine gas to be injected into the gaseous mixture should be equal to or slightly greater than the theoretical quantity necessary for the reaction, i.e., 1 mole of chlorine for 2 moles of hydrobromic acid.

After the reaction of the chlorine gas and the hydrobromic acid gas, the gaseous reaction products are constituted by a mixture of initial organic products, brominated organic products, free bromine, and hydrochloric acid. The gaseous reaction products are then cooled to a temperature between about 0° C. and —15° C. to condense the bromine gas to liquid bromine. Although the melting point of bromine is about —8° C., it was found that in actual practice, due to the various impurities it contains, it was possible to cool the gaseous reaction products down to about —15° C. without solidifying bromine and causing obstruction of the condenser. The vapor-pressure of the bromine being not negligible at —15° C., one can follow up this first condenser by a second condenser maintained at a lower temperature than the first condenser in which the bromine is retained in its solid state. Preferably, this second stage of condensation is constituted by two condensers in parallel, operating alternatively, one being in operation while the other one is on defrosting.

The temperature of this second stage of condensation is only limited by the condensation temperature of the organic products. In practice, it is unnecessary to cool down the gases to temperatures below about —30° C., the loss of bromine due to vapor-pressure being no more than of the order of 1% at this temperature.

It is surprising to find that the bromine recovered according to the present invention, practically does not contain either free chlorine or bromine chloride. It can therefore be directly recycled to the original bromination apparatus without the risk of causing the formation of undesirable organic chlorine compounds, whereas the bromination in the presence of chlorine would lead to the formation of these chlorinated compounds.

One will notice the great simplicity of the arrangement in accordance with the invention. A disadvantage of the process could result from the corrosive property of bromine. However, it is perfectly possible to operate with the customary materials utilized for bromine, such as "Pyrex" glass, quartz, silica, nickel or its alloys, "Teflon" (tetrafluoroethylene polymer), massive or as a lining.

In the case of the bromination of fluorinated products, if one desires to work in siliceous materials, it is necessary to eliminate the always present traces of hydrofluoric acid. For this a passage over silica is sufficient.

As has already been mentioned, the process according to the invention permits the obtaining of bromine in an anhydrous state by direct treatment of reaction gases resulting from the bromination of organic products. It applies more particularly to the recovery of bromine from hydrobromic acid which accompanies the bromination of tri fluoromethane, of difluoromethane and of a mixture of these.

The following non-limitative examples illustrate the process according to the invention.

*Example 1*

One had at his disposal a gaseous mixture resulting from the bromination of trifluoromethane, obtained by the reaction of 12 moles of $CF_3H$ and 12 moles of bromine per hour. The gaseous mixture had the following molar composition:

| | Percent |
|---|---|
| $CF_3Br$ | 38 |
| $CF_3H$ | 12 |
| $HBr$ | 38 |
| $Br_2$ | 12 |

This gaseous mixture, at a temperature of about 20° C., was conducted to the bottom of a first tubular condensing cooler made of Monel metal, of 20 mm. internal diameter and 3,000 mm. high. The base of this cooler was provided with a chlorine intake and a 6 liter "Pyrex" receptacle. The double wall jacket of the cooler was fed with a brine at a temperature of —15° C.

One introduced into the gaseous mixture, 5.1 moles of chlorine gas per hour, at a temperature of about 20° C., this quantity being calculated so that the chlorine content of the gases after reaction of chlorine and hydrobromic acid gases and condensation of the bromine gas into liquid form would be of the order of 2% by volume. This content was estimated by means of an ultra violet ray colorimeter. The liquid bromine collected at the bottom of the first condenser.

The gases coming out of the first condenser-cooler were conducted to a second otherwise identical condensing cooler, but not fed with chlorine, and having an internal diameter of 18 mm. and a height of 2500 mm. This cooler was cooled by means of a brine at —25° C. It was followed by the usual operational sections, as follows: washing with water, alkaline washing, drying, compression and distillation.

When coming out of the second condensing cooler, the gases contained about 2% by volume of chlorine and a small quantity of bromine.

One recovered in this manner 6.4 moles of bromine per hour, i.e. 86% of the bromine present in the gases in the state of HBr.

*Example 2*

The gases coming from the bromination of 24.5 moles/hour of a mixture of $CF_2ClH$ and of $CF_3H$ by 28 moles/hour of bromine were introduced into the first condenser described in Example 1. These gases were constituted by a mixture of hydrobromic acid, hydrochloric acid, bromine in excess and various halogen carbon compounds.

Only the first condenser was utilized. It was fed at its bottom part with chlorine at the rate of 5 moles/hour. One recovered in this manner 12.5 moles/hour of bromine. When leaving the condenser, maintained at —15° C., the gases contained approximately 2% of chlorine and 5% of bromine, by volume.

The yield was thus 84.6% of the bromine contained in the gases in its HBr state.

We claim:

1. A process for recovering bromine in the anhydrous state from a gaseous mixture resulting from the reaction of bromine on an organic compound, said gaseous mixture containing brominated organic compound and hydrogen bromide, which comprises introducing said gaseous mixture having a temperature higher than 0° C. but not over about 50° C., into a condenser, introducing chlorine gas having a temperature higher than 0° C. but not over about 50° C. into said condenser, thereby reacting chlorine gas and hydrogen bromide gas and forming bromine gas and hydrogen chloride gas, cooling in said condenser to a temperature of about 0° C. to —15 °C. the resulting gaseous mixture containing brominated organic compound, free bromine and hydrogen chloride to condense the free bromine, and recovering the liquid bromine.

2. A process for recovering bromine in the anhydrous state from a gaseous mixture resulting from the reaction of bromine on an organic compound of the class consisting of trifluoromethane, difluorochloromethane and mixtures thereof, said gaseous mixture containing brominated organic compound of said class and hydrogen bromide, which comprises introducing said gaseous mixture having a temperature higher than 0° C. but not over about 50° C. into a condenser, introducing chlorine gas having a temperature higher than 0° C. but not over about 50° C. into said condenser, thereby reacting chlorine gas and hydrogen bromide gas and forming bromine gas and hydrogen chloride gas, cooling in said condenser to a temperature of about 0° C. to —15° C. the resulting gaseous mixture containing brominated organic compound of said class, free bromine and hydrogen chloride to condense the free bromine, and recovering the liquid bromine.

3. A process according to claim 1, which comprises cooling the gaseous mixture from which bromine has been condensed, to a temperature lower than that used in said condenser to cause solidification of bromine, and heating the solidified bromine to melt it.

4. A process according to claim 1, wherein the chlorine gas introduced into said mixture amounts to at least 1 mole of chlorine for each 2 moles of hydrogen bromide.

References Cited in the file of this patent

UNITED STATES PATENTS

| | | |
|---|---|---|
| 1,885,029 | Dressel | Oct. 25, 1932 |
| 1,885,255 | Grebe et al. | Nov. 1, 1932 |
| 1,951,356 | Govett | Mar. 20, 1934 |

OTHER REFERENCES

J. W. Mellor's: A comprehensive Treatise on Inorganic and Theoretical Chemistry, vol. 2, 1922 ed., page 203, Longmans Green & Co., New York.

UNITED STATES PATENT OFFICE
CERTIFICATE OF CORRECTION

Patent No. 3,084,028                    April 2, 1963

Louis Foulletier et al.

It is hereby certified that error appears in the above numbered patent requiring correction and that the said Letters Patent should read as corrected below.

Column 2, line 39, for " "Pyrex" " read -- "Pyrex" --; line 52, for "difluoromethane" read -- difluorochloromethane --.

Signed and sealed this 15th day of October 1963.

(SEAL)
Attest:

ERNEST W. SWIDER
Attesting Officer

EDWIN L. REYNOLDS
Acting Commissioner of Patents